July 15, 1958    L. C. STUKENBORG    2,843,407
LATCH FOR ANTI-ROTATIONAL LOCK MEANS
Filed Dec. 10, 1953
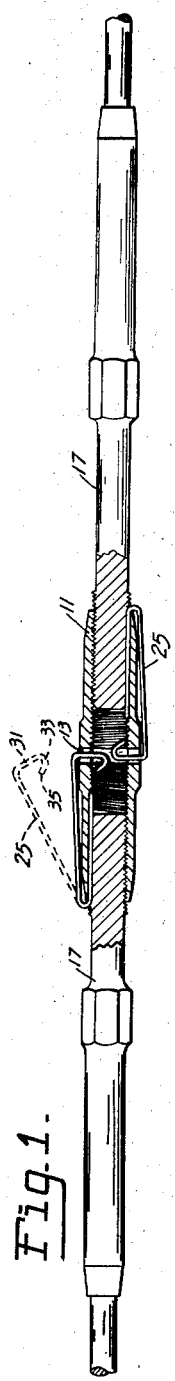
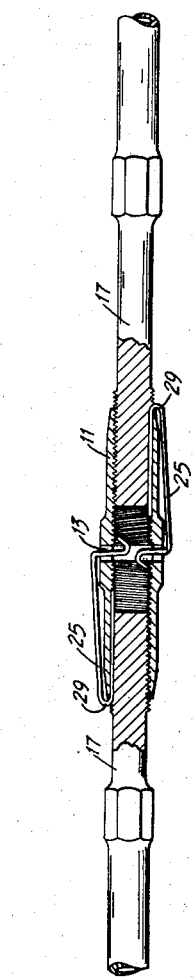
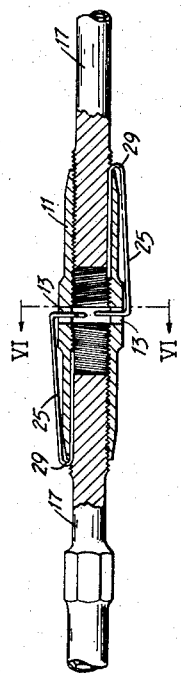
INVENTOR
LOUIS C. STUKENBORG
BY
Weatherford and Weatherford
atty

United States Patent Office 2,843,407
Patented July 15, 1958

2,843,407

LATCH FOR ANTI-ROTATIONAL LOCK MEANS

Louis C. Stukenborg, Memphis, Tenn., assignor of fifty percent to Harold V. Utterback, Osyka, Miss.

Application December 10, 1953, Serial No. 397,344

8 Claims. (Cl. 287—60)

This invention relates to new and useful improvements in anti-rotational locking means adapted for use in connection with threadedly engaged members such as the rod and barrel members of turnbuckles and the like, and is particularly a development of and improvement upon the construction shown and described in Stukenborg and Utterback Patent 2,580,482. In the structure of said patent a wire-like locking device is shown which includes a portion engaging registered grooves of the turnbuckle rod and barrel members to prevent relative rotation between said members, and it further includes an anchor portion extending into a central aperture formed in the turnbuckle barrel for limiting longitudinal movement of the locking device relative to the turnbuckle barrel. Such previous locking means have proved highly efficient with the exception that in some circumstances the removable character of the anchor lug has permitted accidental disengagement of the lock means under specific circumstances, and to that end the prior device had preferably provided for convergence of the locking portion with the stem portion so as to tend to urge the anchor to remain in inserted position, thus seeking to limit the opportunity for accidental disengagement of the locking device.

The present invention contemplates providing the anchor portion of such locking means which extends away from the stem of the device with a reversely bent hook portion in which the tip of the hook is turned toward the level of the stem portion, and in which the tip of the hook is spaced from the anchor portion a distance slightly in excess of the diameter of the aperture formed in an internally threaded member such as a turnbuckle barrel so that the anchor and hook may be forced into the aperture and the tip of the hook will engage beneath the material of the barrel-like member adjacent such aperture latching the anchor in position against accidental removal.

The invention further contemplates forming the locking and latching device of resilient wire and normally positioning the lock member and stem portion of the device so that when disengaged from the assembly the same diverge away from the connection between said portions to impart a spring action to the device in use position, urging the anchor to move outwardly so as to more solidly seat the hook portion in engagement with the interior of the barrel-like member.

The principal object of the present invention is to provide an assembly of threadedly engaged members, locking means for preventing relative rotation of the members, and means for latching such locking means in use position against accidental removal.

A further object of the invention is to provide such locking means which include a longitudinal stem, a lock member, for engaging registered grooves of threadedly engaged members such as a turnbuckle rod and barrel, connected to one end of the stem, and an anchor connected to the opposite end of the stem for insertion in an aperture formed in a barrel-like member in which the free end of the anchor is provided with a latching hook projecting away from the anchor toward the level of the stem for engaging the interior of the barrel-like member adjacent the aperture.

A further object of the invention is to provide in such a device a latch hook in which the tip of the hook is spaced from the anchor a distance in excess of the diameter of an aperture formed in a barrel-like member, and the hook is resilient to permit insertion into such aperture and to expand inwardly of the aperture to engage material of the barrel-like member against removal.

A further object of the invention is to provide such a latch hook in which the hook is bent to lie in the plane of the stem.

A further object of the invention is to provide such a co-planar latch hook which projects toward the junction between the stem and the lock member.

A further object of the invention is to provide such a co-planar latch hook in which the hook is bent to project away from the junction of the stem and lock member.

A further object of the invention is to provide such a latch hook which is bent to lie in a plane angularly intersecting the plane of the stem.

A further object of the invention is to provide such locking means in which the lock member and stem diverge from their junction when disengaged and the device is formed of resilient material which in locking position urges the anchor outwardly of an aperture formed in a barrel-like member to solidly engage the tip of the hook with the interior of the barrel-like member; and A further object of the invention is to improve the design, construction and efficiency of anti-rotational locking means adapted for use in turnbuckle assemblies.

The means by which the foregoing and other objects of the present invention are accomplished and the manner of their accomplishment will be readily understood from the following specification upon reference to the accompanying drawings, in which:

Fig. 1 is a longitudinal elevational view partly fragmentary and with parts broken away for purposes of illustration, showing a turnbuckle assembly with one form of the locking device in locking position.

Fig. 2 is a side elevational view of the locking device shown in Fig. 1 in disengaged position.

Fig. 3 is a view similar to Fig. 1 illustrating another form of the locking device in locking position.

Fig. 4 is a view similar to Fig. 2 illustrating the locking device, shown in Fig. 3, when disengaged.

Fig. 5 is a view similar to Fig. 1 illustrating a further form of the locking device in locking position.

Fig. 6 is a cross-sectional view taken on the line VI—VI of Fig. 5.

Fig. 7 is a view similar to Fig. 2 of the locking device shown in Figs. 5 and 6, when disengaged.

Fig. 8 is an end view of the locking device as shown in Fig. 7.

Fig. 9 is a longitudinal elevational view of one of the terminal rods rotated 90 degrees from the position shown in Figs. 1, 3 and 5; and Fig. 10 is a longitudinal sectional view of the turnbuckle barrel likewise rotated 90 degrees from the position of Figs. 1, 3 and 5.

Referring now to the drawings in which the various parts are indicated by numerals, the present invention is directed to anti-rotational lock means for assemblies of threadedly connected members, and is specifically illustrated in conjunction with such an assembly represented by a turnbuckle assembly which includes a hollow barrel-like turnbuckle sleeve or barrel 11 which is internally threaded at its opposite ends with right and left hand threads, and intermediate its length is provided with diametrically opposed apertures 13, which extend through the material forming the wall of the barrel 11, communicating into the hollow interior of the barrel. It will be observed that the apertures 13 extend transversely of the barrel intermediate its length.

Threadedly engaged with the opposite ends of the barrel are a pair of rod-like cable terminals 17, which respectively are provided with right and left hand threads for engaging the similarly pitched internal threading of the barrel. Barrel 11 is preferably provided with longitudinally extending grooves 21 which extend across the threaded portions and are preferably of a depth substantially equal to the depth of the threads. Preferably each end of the turnbuckle barrel is provided with at least one of the longitudinal grooves 21, although if desired additional circumferentially spaced grooves may be provided for incremental adjustment of the turnbuckle when assembled. Each of the rods 17 is provided with at least one longitudinally extending groove 23 which extends across the threads of the threaded portion of the rod and is preferably of a depth substantially equal to the depth of the threads, the respective grooves 21, 23 of the barrel and rods being adapted to be moved into register and to cooperate together to form a housing to receive the locking part of the locking device.

The locking device of the present invention is preferably formed from a length of resilient wire-like material and includes a stem 25 of a length to span from one of the apertures 13 to an end of the barrel 11. To one end of stem 25 a lock member 27 is integrally connected preferably by an arcuately turned connecting portion 29. Normally and when disengaged, lock member 27 and stem 25 project divergingly away from connecting portion 29 and the resiliency of the material urges the return of stem 25 and lock member 27 to such diverging position upon occasions when these elements are compressed together. Lock member 27 is of a size to lie in registered grooves 21, 23, and when so positioned in the registered grooves to prevent relative rotational movement between the threadedly engaged members.

To the opposite end of stem 25 an anchor 31 is integrally connected, anchor 31 being bent substantially at right angles to stem 25 and projecting from the same side of stem 25 as does lock member 27, the stem, lock member and anchor being substantially co-planar. At its distal end anchor 31 is provided with a latch hook 33 which is formed by reversely bending the material beyond the anchor 31 so as to project the tip 35 of hook 33 toward the level of stem 25.

In the forms shown in Figs. 2 and 4 latch hook 33 is also co-planar with the other portions of the locking device, while in the form as shown in Figs. 7 and 8 latch hook 33 lies in a plane angularly intersecting the plane of the other elements of the locking device, being shown as rotated substantially 90 degrees. In the form as specifically shown in Fig. 2, latch hook 33 is turned to face toward connecting portion 29, while in the form specifically shown in Fig. 4 latch hook 33 is turned to face away from connector 29. The tip 35 is spaced from the level of stem 25 slightly in excess of the thickness of the material forming the wall of barrel 11, and tip 35 is also spaced from anchor 31 a distance in excess of the diameter of an aperture 13.

In the use of the device, with the threadedly engaged members, illustrated as consisting of rods 17, and barrel 11, adjusted to desired relative position and with longitudinal grooves 21, 23 moved into register, lock member 27 is inserted in the registered grooves. When thus inserted, as shown in dotted lines in Fig. 1, stem 25, due to its normal arrangement diverging from lock member 27, flares away from the exterior of barrel 11 while extending generally toward the central portion of barrel 11, so that anchor 31 and hook 33 are spaced adjacent one of the apertures 13. With the locking device thus positioned, stem 25, anchor 31 and hook 33 may be moved against the resilience of the material toward the external entrance of one of the barrel apertures with the exterior of the hook engaging the entrance to the aperture by applying pressure to stem 25, preferably adjacent anchor 31. Hook 33 may be caused to compress against the resiliency of the material, moving tip 35 more closely adjacent anchor 31 and permitting the hook to pass through the selected aperture into the hollow interior of the barrel. When tip 35 has passed beyond the thickness of the wall of barrel 11 the compressing restraint on hook 33 and tip 35 exercised by the aperture during passage therethrough will be released and the hook will expand, snapping into latching position with tip 35 extending beyond the periphery of aperture 13, so that movement of the stem and anchor outwardly away from barrel 11 is limited and effectively prohibited by engagement of tip 35 with the interior of barrel 11 adjacent but slightly spaced from the aperture.

It will be observed that the resiliency of the locking device causes tip 35 to be moved into engagement with the interior of the barrel immediately upon release of the inserting pressure. As shown in Fig. 1, hook 33 is turned so as to project toward connector 29 and thus engages the interior of barrel 11 on the same side of the aperture which is engaged by the other portions of the locking device, while in the arrangement illustrated in Fig. 3, with hook 33 turned to project away from connector 29, the hook engages the interior of the barrel beyond the aperture and more remote from the barrel portions engaged by the other elements of the locking device. In the assembly illustrated in Figs. 5 and 6, employing the locking device as shown in Figs. 7 and 8, in which the hook is turned substantially at right angles to the remaining portions of the locking device, the interior of the barrel is engaged by the tip 35 substantially along the midline of the barrel but spaced away from the periphery of the respective apertures.

It is found that with hook 33 being a short turned arcuate hook the wire-like material of which the locking device is formed will permit compression to accommodate insertion of the hook through a selected aperture 13, but will resist expansion beyond its original limits so as to substantially prevent removal of the hook and anchor portions from the aperture. This function is enhanced by the fact that the tip of the hook is turned so as to be presented to engage against the interior of the barrel spaced from the selected aperture. It thus will be seen that the present device effectively prevents the accidental or undesired removal of the locking device from the threadedly engaged members, thus insuring against loss of the locking devices and consequently preventing any accidental disturbance of the desired adjustment of the threadedly engaged members.

It will be understood that hook 33 may be disposed in other planes angularly intersecting the plane of the stem, lock part and anchor portions in addition to the specific angular intersection illustrated in Figs. 7 and 8.

I claim:

1. In a turnbuckle assembly, an externally threaded, longitudinally grooved member, an internally threaded, longitudinally grooved, hollow, barrel-like member, said members being threadedly engaged with their longitudinal grooves in register, and the wall of said barrel-like member being apertured intermediate the length of said barrel-like member to form at least one transverse aperture communicating from exterior said barrel-like member into the hollow interior thereof, unitary locking means for preventing relative rotation between said members comprising a stem lying exterior to and longitudinally of said barrel-like member, a locking part lying inwardly of said stem and in said registered grooves, means connecting said locking part to one end of said stem, an anchor connected to and projecting inwardly away from the opposite end of said stem and extending through said transverse aperture into said hollow interior, and an arcuate latch hook connected to the distal end of said anchor and projecting outwardly from said distal end alongside and spaced from said anchor through substantially one half the length of said anchor, said hook lying within the hollow interior of said barrel-like member, said hook terminating in an outwardly facing tip, said tip being spaced inwardly from said stem in excess of the thickness of said wall and spaced laterally from said anchor in excess of the diameter of said aperture, said locking means being resilient and biased to urge said stem and said locking part divergingly apart and urging said anchor outwardly from said aperture, said tip engaging the interior of said barrel-like member spaced laterally from the periphery of said aperture to substantially prevent removal of said anchor and hook from said aperture and maintain said locking means in engagement with said assembly.

2. An assembly in accordance with claim 1, in which said hook is co-planar with and projects toward the connection between said stem and said locking part, and said tip engages the interior of said barrel-like member proximate to said locking part.

3. An assembly in accordance with claim 1, in which said hook is co-planar with and projects away from the connection between said stem and said locking part, and said tip engages the interior of said barrel remote from said locking part.

4. An assembly in accordance with claim 1, in which said stem, said anchor and said locking part lie in a common plane, said hook lies in a plane which angularly intersects the first said plane, and said tip engages the interior of said barrel-like member substantially on the transverse midline of said barrel-like member.

5. Unitary locking means for preventing relative rotation between threadedly engaged members comprising an outer stem, an inner locking part, means connecting said locking part to one end of said stem, an anchor connected to and projecting inwardly away from the opposite end of said stem, and an arcuate latch hook connected to the distal end of said anchor and projecting outwardly from said distal end alongside and spaced from said anchor through substantially one half the length of said anchor, said hook terminating in an outwardly facing tip, said tip being spaced inwardly from said stem and spaced laterally from said anchor, said locking means being resilient and biased to urge said stem and said locking part divergingly apart and urging said anchor outwardly.

6. A device in accordance with claim 5, in which said hook is co-planar with and projects toward the connection between said stem and said lock member, and said tip is positioned to engage the interior of a barrel member proximate to said lock member.

7. A device in accordance with claim 5, in which said hook is co-planar with and projects away from the connection between said stem and said lock member, and said tip is positioned to engage the interior of a barrel member remote from said lock member.

8. A device in accordance with claim 5, in which said stem, said anchor and said lock member lie in a common plane, and said hook lies in a plane which angularly intersects the first said plane, said tip being positioned to engage the interior of a barrel member substantially on the transverse midline of the barrel member.

References Cited in the file of this patent

UNITED STATES PATENTS

| | | |
|---|---|---|
| 1,036,991 | Fox | Aug. 27, 1912 |
| 1,129,787 | Bright | Feb. 23, 1915 |
| 2,353,795 | Tinnerman | July 18, 1944 |
| 2,353,796 | Tinnerman | July 18, 1944 |
| 2,449,646 | Emde | Sept. 21, 1948 |
| 2,450,252 | Oliver | Sept. 28, 1948 |
| 2,580,482 | Stukenborg et al. | Jan. 1, 1952 |

FOREIGN PATENTS

| | | |
|---|---|---|
| 4,753 | Australia | Apr. 26, 1932 |